(12) United States Patent
Yoshida et al.

(10) Patent No.: US 11,531,693 B2
(45) Date of Patent: Dec. 20, 2022

(54) INFORMATION PROCESSING APPARATUS, METHOD AND NON-TRANSITORY COMPUTER READABLE MEDIUM

(71) Applicant: KABUSHIKI KAISHA TOSHIBA, Tokyo (JP)

(72) Inventors: Takami Yoshida, Kamakura Kanagawa (JP); Kenji Iwata, Tokyo (JP); Yuka Kobayashi, Seto Aichi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 17/186,827

(22) Filed: Feb. 26, 2021

(65) Prior Publication Data

US 2022/0083577 A1    Mar. 17, 2022

(30) Foreign Application Priority Data

Sep. 11, 2020  (JP) .............................. JP2020-153113

(51) Int. Cl.
*G06F 16/332* (2019.01)
*G06F 16/33* (2019.01)
*G06F 40/35* (2020.01)
*G06F 40/284* (2020.01)

(52) U.S. Cl.
CPC ...... *G06F 16/3329* (2019.01); *G06F 16/3344* (2019.01); *G06F 40/284* (2020.01); *G06F 40/35* (2020.01)

(58) Field of Classification Search
CPC .. G06F 16/3329; G06F 16/3344; G06F 40/35; G06F 40/284
See application file for complete search history.

(56) References Cited

U.S. PATENT DOCUMENTS

| | | |
|---|---|---|
| 2018/0330252 A1 | 11/2018 | Sawano et al. |
| 2020/0097494 A1* | 3/2020 | Vertsel ................ G06F 16/3329 |
| 2020/0143792 A1 | 5/2020 | Iwata et al. |
| 2020/0242144 A1 | 7/2020 | Yoshida et al. |
| 2020/0243082 A1 | 7/2020 | Yoshida et al. |

FOREIGN PATENT DOCUMENTS

| | | |
|---|---|---|
| JP | 2018-195298 | 12/2018 |
| JP | 2020-077159 | 5/2020 |
| JP | 2020-123131 | 8/2020 |
| JP | 2020-123132 | 8/2020 |

\* cited by examiner

*Primary Examiner* — Sonia L Gay (74) *Attorney, Agent, or Firm* — Knobbe, Martens, Olson & Bear LLP (57) ABSTRACT

According to one embodiment, an information processing apparatus includes a processing circuit. The processing circuit generates each of keywords stored in a frequently asked question (FAQ) collection as an utterance sentence. The processing circuit generates dialogue data for each of the keywords, the dialogue data generated by performing a dialogue for each of the keywords at least once, the dialogue obtained by generating a response sentence to the utterance sentence based on a result of searching the FAQ collection by use of the utterance sentence. The processing circuit generates aggregation data representing how often each of the keywords is used in the dialogue, based on the dialogue data.

10 Claims, 9 Drawing Sheets

| Keyword | Presentation frequency |
|---|---|
| Bank account | 5 times (0.10) |
| Balance confirmation | 7 times (0.14) |
| Application | 12 times (0.24) |
| ... | ... |

(b)

| ID | Narrowing-down frequency |
|---|---|
| a | 3 times (0.15) |
| b | 4 times (0.20) |
| c | 5 times (0.25) |
| ... | ... |

(c)

The average number of turns in the dialogue is 2.5 turns.

INFORMATION PROCESSING APPARATUS, METHOD AND NON-TRANSITORY COMPUTER READABLE MEDIUM

CROSS-REFERENCE TO RELATED APPLICATIONS

This application is based upon and claims the benefit of priority from prior Japanese Patent Application No. 2020-153113, filed Sep. 11, 2020, the entire contents of which are incorporated herein by reference.

FIELD

Embodiments described herein relate to an information processing apparatus, method and non-transitory computer readable medium.

BACKGROUND

In general, a dialogue system executes a process desired by the user, such as answering a question asked by a user, by exchanging speech, text or the like with the user. In particular, a dialogue system that asks questions where a user's utterance lacks necessary information and that makes a final response after making a response a number of times is expected to be used in a wide range of fields, because such a dialogue system can flexibly deal with complicated requests and ambiguous instructions from the user. This type of dialogue system conducts a dialogue based on a scenario (referred to as a dialogue scenario as well) in which utterances of a user and responses to the utterances are defined. Therefore, in order to provide a dialogue system that is easy for a user to use and that can flexibly make a response, a dialogue scenario that is easy for the user to use has to be prepared.

In order to verify the operation of a dialogue system that is based on a dialogue scenario, for example, logs accumulated during the operation of the dialogue system are analyzed and how often each branch of the dialogue scenario is used is calculated and displayed. This method, however, cannot verify the operation of the dialogue system where a dialogue scenario is automatically generated and each branch changes dynamically, or where the dialogue scenario is not used per se. For example, even if a dialogue system is designed to guide a user's question to a frequently asked question (FAQ) containing appropriate answers, based on a FAQ collection that stores a plurality of FAQs, a dialogue scenario is automatically generated or does not exist in such a dialog system, so that an operation of the dialogue system cannot be verified.

DETAILED DESCRIPTION

In general, according to one embodiment, an information processing apparatus includes a processing circuit. The processing circuit generates each of a plurality of keywords stored in a frequently asked question (FAQ) collection as an utterance sentence, the FAQ collection storing a plurality of FAQs each including a question, an answer to the question, and one or more keywords extracted from the question. The processing circuit generates dialogue data for each of the plurality of keywords, the dialogue data generated by performing a dialogue for each of the plurality of keywords at least once, the dialogue obtained by generating a response sentence to the utterance sentence based on a result of searching the FAQ collection by use of the utterance sentence. The processing circuit generates aggregation data representing how often each of the plurality of keywords is used in the dialogue, based on the dialogue data.

Hereinafter, an information processing apparatus, method and non-transitory computer readable medium according to the present embodiment will be described with reference to the accompanying drawings. In the embodiments described below, elements assigned with the same reference symbols perform the same operation, and a redundant description of such elements will be omitted as appropriate. A description will now be given of one embodiment with reference to the drawings.

First Embodiment

Figure 1:
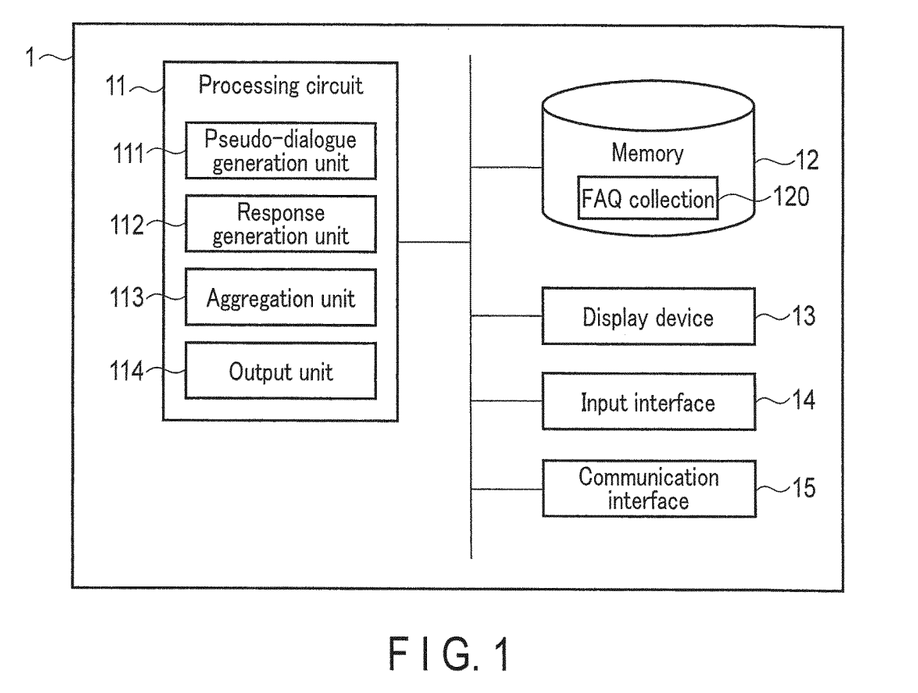
FIG. 1 is a diagram showing a configuration example of an information processing apparatus according to a first embodiment.

A configuration example of an information processing apparatus 1 according to the first embodiment will be described with reference to FIG. 1.

The information processing apparatus 1 includes respective components (namely, a processing circuit 11, a memory 12, a display device 13, an input interface 14 and a communication interface 15). The information processing apparatus 1 is implemented in the form of hardware or software. The components are communicably coupled to each other via a bus. It should be noted that each component does not have to be individual hardware. For example, at least two of the components may be integrated as one hardware element.

The processing circuit 11 controls the operation of the information processing apparatus 1. The processing circuit 11 includes hardware processors such as a CPU (Central Processing Unit), an MPU (Micro Processing Unit), a GPU (Graphics Processing Unit) and an FPU (Floating Point Unit). By executing programs expanded in the memory 12 by means of the processors, the processing circuit 11 executes the functions of the elements (a pseudo-dialogue generation unit 111, a response generation unit 112, an aggregation unit 113 and an output unit 114) corresponding to the programs. It should be noted that each element does not have to be a processing circuit 11 consisting of a single processor. For example, the elements may be realized by a processing circuit 11 that combines a plurality of processors.

The pseudo-dialogue generation unit 111 and the response generation unit 112 refer to a FAQ collection that stores a plurality of FAQs each including a question, an answer to the question, and one or more keywords extracted from the question. The pseudo-dialogue generation unit 111 and the response generation unit 112 generate each of the plurality of keywords included in the FAQ collection as an utterance sentence, and conduct a dialogue in which a response sentence to the utterance sentence is generated based on the result of searching the FAQ collection by use of the utterance sentence. The dialogue is conducted for each of the plurality of keywords at least once, thereby generating dialogue data pertaining to the dialog conducted at least once for each of the plurality of keywords. The pseudo-dialogue generation unit 111 and the response generation unit 112 are collectively referred to as a generation unit.

Based on the dialogue data, the aggregation unit 113 generates aggregation data in which data representing how often the plurality of keywords are used in the dialogue are aggregated.

The output unit 114 outputs the aggregation data.

The memory 12 stores information such as data and programs used by the processing circuit 11. The memory 12 includes a semiconductor memory element, such as a RAM (Random Access Memory), as hardware. The memory 12 may be a drive device that reads and writes information to and from an external storage device, such as a magnetic disk (a Floppy™ disk or a hard disk), a magneto-optical disk (MO), an optical disk (CD, DVD or Blu-ray™), a flash memory (a USB flash memory, a memory card or SSD) or a magnetic tape. The storage area of the memory 12 may be inside the information processing apparatus 1 or may be in an external storage device. In the present embodiment, it is assumed that the memory 12 stores the FAQ collection 120 shown in FIG. 2 in advance.

An example of the FAQ collection will be described with reference to FIG. 2.

The FAQ collection 120 is a database containing a plurality of FAQs (also referred to as question-and-answer pairs) 120a to 120K. The FAQs 120a to 120K are associated with IDs 121a to 121K for distinguishing the FAQs from each other, questions 122a to 122K, answers 123a to 123K to the questions, and keywords 124a to 124K included in the questions. The keywords 124a to 124K may be stored not only inside the FAQ collection 120 but also outside thereof, as long as they are associated with the FAQs 120a to 120K. For example, the keywords 124a to 124K may be stored in the storage area of the memory 12 existing in the information processing apparatus 1 or in an external storage device.

The keywords 124a-124K are extracted from the questions 122a-122K. A plurality of keywords may be extracted from one question. The keywords 124a to 124K may be extracted in advance by the information processing apparatus 1 or may be extracted in advance by an external processing device. Alternatively, the keywords 124a to 124K may be manually given to the questions 122a to 122K, for example, by the administrator of the FAQ collection 120.

The keywords 124a to 124K are extracted, for example, based on a morphological analysis model or a morphological analysis rule. Specifically, the information processing apparatus 1 performs morphological analysis on the sentences included in the questions 122a to 122K by use of the morphological analysis model, decomposes the sentences into a plurality of words, and estimates a word class of each word. Next, the information processing apparatus 1 extracts the words belonging to a specific word class (noun, verb, etc.) from the words, as keywords 124a to 124K. With respect to a compound noun, which is one type of noun, each of a plurality of nouns included in the compound noun may be extracted as a keyword, the entire compound noun may be extracted as one keyword, or both methods may be combined. Alternatively, a word (unknown word) that does not belong to any word class may be extracted as a keyword.

For example, the first FAQ 120a is associated with ID121a "a", the question 122a "I want to confirm the balance of the bank account", the answer 123a "To confirm the balance . . . ", and the keyword 124a "bank account, balance confirmation", and is stored. The last FAQ 120K is associated with ID121K "K", the question 122K "I want to apply for a loan", the answer 123K "It depends on the type of loan. In the case of a housing loan . . . ", and the keyword 124K "loan, application", and is stored.

The display device 13 displays information, such as data generated by the processing circuit 11 and data stored in the memory 12. As the display device 13, a display such as a cathode ray tube (CRT) display, a liquid crystal display (LCD), a plasma display, an organic electro-luminescence display (OELD), a tablet terminal, or the like can be used.

The input interface 14 receives an input from a user who uses the information processing apparatus 1, converts the received input into an electric signal, and outputs the electric signal to the processing circuit 11. As the input interface 14, a physical operation device, such as a mouse, a keyboard, a trackball, a switch, a button, a joystick, a touch pad or a touch panel display can be used. The input interface 14 may be replaced with a device that receives an input from an external input device separate from the information processing apparatus 1, converts the received input into an electric signal, and outputs the electric signal to the processing circuit 11. The user is, for example, the administrator of the FAQ collection 120.

The communication interface 15 transmits and receives data to and from an external device or an external network. Any communication standard can be used for the communications between the communication interface 15 and the external device or the external network. The communication method may be either wired or wireless. For example, the information processing apparatus 1 transmits and receives data to and from a printer or the Internet (not shown) via the communication interface 15, causes a printer to print the data generated by the information processing apparatus 1, or causes the data to be displayed on a web page.

Figure 3:
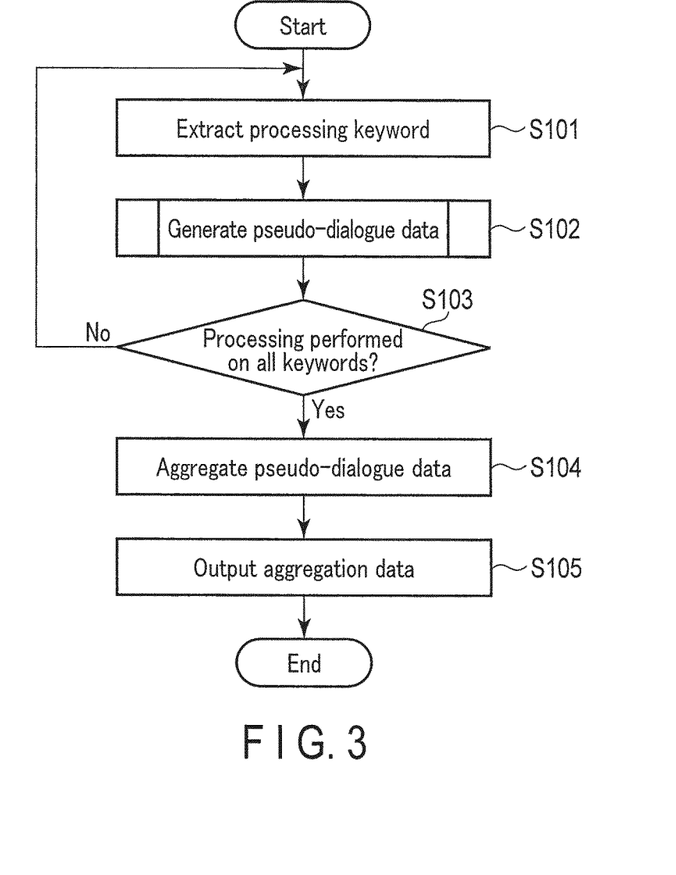
FIG. 3 is a diagram showing an operation example of the information processing apparatus according to the first embodiment.
Figure 4:
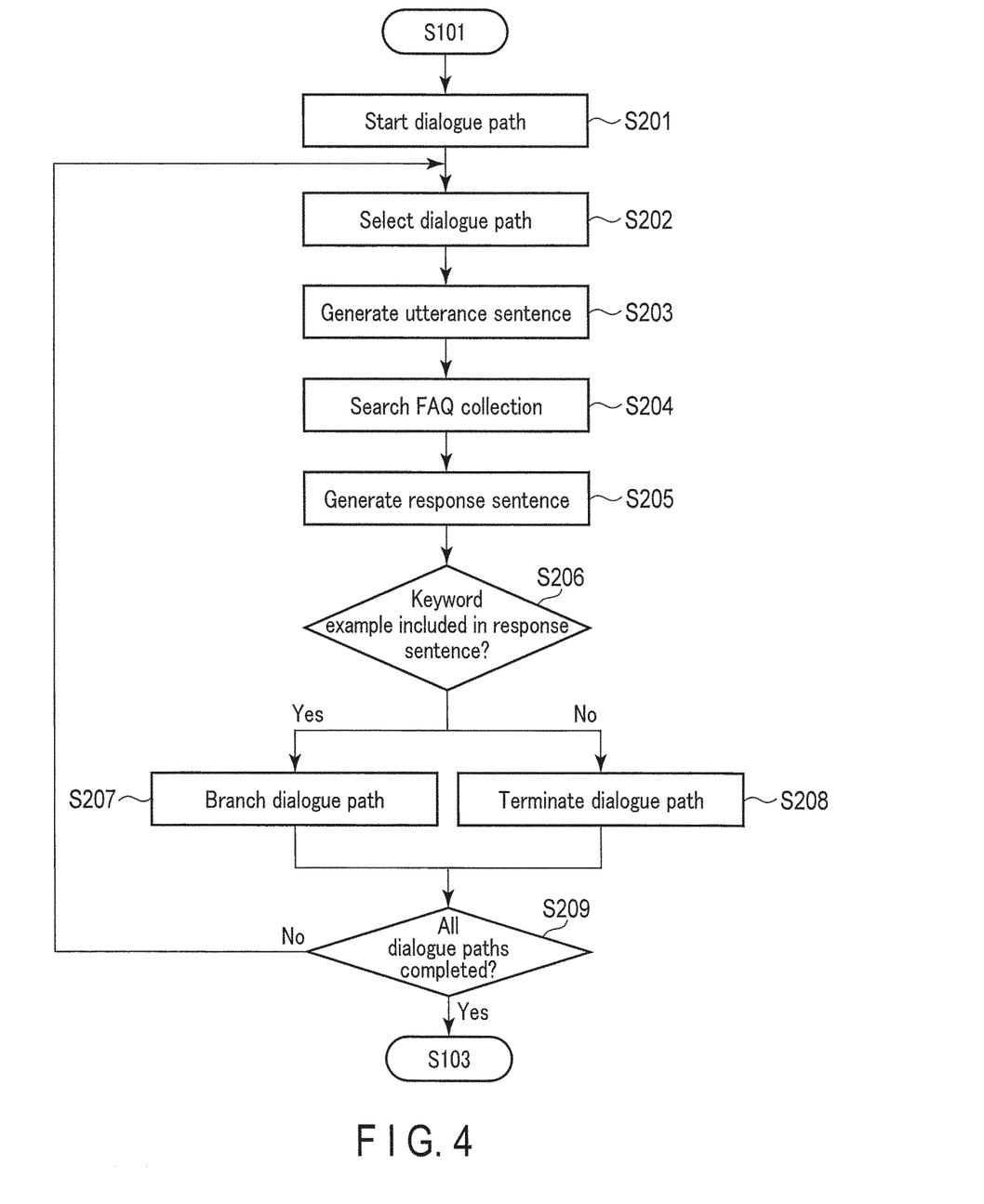
FIG. 4 is a diagram showing an operation example relating to details of a pseudo-dialogue data generation process.

An operation example of the information processing apparatus 1 according to the first embodiment will be described with reference to FIGS. 3 and 4. FIG. 3 shows an example of the overall operation of the information processing apparatus 1, and FIG. 4 shows an operation example relating to details of the pseudo-dialogue data generation process (step S102) shown in FIG. 3.

In step S101, the pseudo-dialogue generation unit 111 extracts one of a plurality of keywords 124a to 124K included in the FAQ collection 120 stored in the memory 12 as a processing keyword. At this time, where a plurality of keywords are associated with one FAQ, each of the plurality of keywords is extracted. Where one keyword is associated with a plurality of FAQs, duplication is eliminated and one keyword is extracted. That is, the processing keyword is a keyword extracted from a plurality of keywords 124a to 124K, with duplicates eliminated. In the present embodiment, M processing keywords are extracted from the plurality of keywords 124a to 124K, with duplicates eliminated.

In step S102, the information processing apparatus 1 uses the extracted processing keywords to generate pseudo-dialogue data. The pseudo-dialogue data is data relating to a pseudo-dialogue that imitates a dialogue including an utterance of a user and a response that the dialogue system outputs in response to the utterance, based on the FAQ collection 120.

Details of the pseudo-dialogue data generation process will be described with reference to FIG. 4.

In step S201, the pseudo-dialogue generation unit 111 starts a dialogue path starting from a processing keyword. The dialogue path is a flow of dialogue generated by repeating a dialogue a number of turns, with an utterance and a response to the utterance being dealt with as one turn. Where the response includes keywords presented as examples (referred to keyword examples as well), the dialogue path branches in accordance with the number of the keywords and comes to an end when one FAQ is finally reached. That is, the dialogue path is a series of dialogues that start from the processing keyword, make progress using the keyword examples as intermediate points, and come to an end at a specific FAQ. When step S201 is executed (first turn), a processing keyword is added to the dialogue path as a starting point.

In step S202, the pseudo-dialogue generation unit 111 selects a dialogue path that has not yet been completed by the current turn (the processing time point) from among the dialogue paths. When step S202 is executed first time (first turn), there is one dialogue path that can be selected, so that this dialogue path is selected. On the other hand, when step 202 is executed second or subsequent time (second turn or thereafter), there are a plurality of dialogue paths that can be selected, so that one of the plurality of dialogue paths is selected. By selecting one of the plurality of dialogue paths, one of the plurality of keyword examples presented in the previous turn is selected.

In step S203, the pseudo-dialogue generation unit 111 generates an utterance sentence using all keywords selected up to the current turn, in the selected dialogue path. When step S203 is executed first time (first turn), an utterance sentence is generated using the processing keyword. On the other hand, when step S203 is executed second or subsequent time (second turn or thereafter), an utterance sentence is generated using all keywords (processing keyword and keyword examples) that are selected up to step S202. The generated utterance sentence is stored in the memory 12.

The generated utterance sentence may be a natural sentence similar to a human utterance, such as "Search for AA" and "Search for AA and BB." Alternatively, it may be simply a list of keywords such as "AA" and "AA, BB." These utterance sentences are pseudo utterance sentences that imitate actual utterances of the user.

In step S204, the response generation unit 112 searches the FAQ collection 120, using all keywords included in the generated utterance sentences. When step S204 is executed first time (first turn), the FAQ collection 120 is searched using the processing keyword. On the other hand, when step S204 is executed second or subsequent time (second turn or thereafter), the FAQ collection is searched using all keywords (processing keyword and keyword examples).

Specifically, the response generation unit 112 collates all keywords included in the generated utterance sentence with the plurality of keywords 124a to 124K stored in the FAQ collection 120, and FAQs that include all matching keywords are extracted as answer candidates. When the keywords are collated, determination may be made by exact matching or by partial matching that allows paraphrase expressions. When determination is made by exact matching, the character strings of the keywords are checked. When determination is made by partial matching, keywords having the same "kanji" portion and different "okurigana" (suffix to "kanji") may be first determined as the same keywords. For example, "申し込み (application)", "申 込み (application)" and "申込 (application)" each with different "okurigana" may be determined as the same keywords. Second, keywords that are read in the same way 申し may be determined as the same keywords. For example, "申し 込み (application)", "申しこみ (application)", "もうし込み (application)" and "もうしこみ (application)" each written differently but read in the same way may be determined as the same keywords. In addition, keywords whose editing distances or cosine distances between word vectors are equal to or less than a threshold value may be determined as the same keywords.

In step S205, the response generation unit 112 generates a response sentence, based on the answer candidates extracted as search results. Specifically, the response generation unit 112 generates a response sentence according to the number of answer candidates. Where there is only one answer candidate, a response sentence is generated using the "question" and "answer" included in the FAQ that is the answer candidate. For example, a fixed sentence such as "The question is 'CCC'? DDD" is prepared, and a response sentence may be generated by embedding a "question" in "CCC" and an "answer" in "DDD." On the other hand, where there are a plurality of answer candidates, a response sentence is generated by checking the number of answer candidates and presenting some of the keywords included in the answer candidates. For example, a fixed sentence such as "There are N answer candidates (N is a natural number of two or more). Are there any other keywords?"About <Keyword A>, About <Keyword B>, etc." is prepared, and a response statement may be generated by embedding the number of answer candidates in "N" and keyword examples in "Keyword A" and "Keyword B." The keyword examples are different from all keywords included in the utterance sentence generated in step S203. The generated response statement is stored in the memory 12. As described above, the response sentence may be a natural sentence close to a human utterance, or may be simply a list of keywords such as "keyword A, keyword B."

In step S206, the pseudo-dialogue generation unit 111 determines whether or not the generated response sentence includes a keyword example. If it is determined that the keyword example is included, the process proceeds to step S207. On the other hand, if it is determined that the keyword example is not included, the process proceeds to step S208. The case where the keyword example is included is a case where the answer candidates have to be narrowed down but cannot be narrowed down to one FAQ. The case where the keyword example is not included is a case where the answer candidates are narrowed down to one FAQ.

In step S207, the pseudo-dialogue generation unit 111 branches the dialogue path by adding each of the keyword examples to the dialogue path. At this time, the dialogue path branches into a plurality of branches in accordance with the number of keyword examples. Each time step S207 is executed, each of the keyword examples is added to the dialogue path as an intermediate point.

In step S208, the pseudo-dialogue generation unit 111 adds an ID that identifies one narrowed-down FAQ to the dialogue path, and ends the dialogue path. Each time step S208 is executed, the ID of the narrowed-down FAQ is added to the dialogue path as an ending point. Thus, one dialogue path is generated such that the processing keyword is a starting point, the keyword examples presented in dialogue turns conducted up to the current time are intermediate points, and the narrowed-down one FAQ is an ending point. The generated dialogue path is stored in the memory 12.

In step S209, the pseudo-dialogue generation unit 111 determines whether all dialogue paths starting from the processing keyword have been completed. If it is determined that all dialogue paths have been completed, the process proceeds to step S103. Thus, the generation of pseudo-dialogue data related to the processing keyword is completed, and pseudo-dialogue data is generated. The generated pseudo-dialogue data is stored in the memory 12. The pseudo-dialogue generation unit 111 may forcibly end the generation of pseudo-dialogue data when a specific number of turns are executed. On the other hand, if it is determined that a dialogue path that has not been completed remains, the process returns to step S202. Since the dialogue path branches after the execution of step S207, the process may return directly to step S202 without executing the determination processing in step S209.

In step S103, the pseudo-dialogue generation unit 111 determines whether or not processing has been performed on all keywords included in the plurality of keywords 124a to 124K of the FAQ collection 120, that is, M keywords. If it is determined that the processing has been completed (Yes in step S103), the process proceeds to step S104. Thus, pseudo-dialogue data 130a to 130M corresponding to the M keywords included in the plurality of keywords 124a to 124K are generated. On the other hand, if it is determined that the processing has not yet been completed (No in step S103), the process returns to step S101.

In step S104, the aggregation unit 113 aggregates the pseudo-dialogue data 130a to 130M and generates aggregation data. For example, the aggregation data is generated by aggregating data representing how often each keyword is used in all dialogue paths that start from the M keywords of the pseudo-dialogue data 130a to 130M, data representing how often each keyword example is presented in response sentences (keyword example presentation frequency), data representing how often a FAQ is narrowed down to one answer candidate for each ID (narrowing-down frequency), and data representing an average number of dialog turns performed from the M keywords and until the end of all dialogue paths (average turn number).

It should be noted that the aggregation unit 113 may aggregate the keyword example presentation frequency of each keyword presented in the immediately preceding turn, for each FAQ ID finally narrowed down in each dialogue path. Since this aggregated result is displayed, the administrator of the FAQ collection 120 can easily recognize which keywords strongly characterize a specific FAQ.

For example, it is assumed that the FAQ collection 120 contains many FAQs including "申し込み (application)" with one okurigana as a keyword, and contains only one FAQ 120p including "申込み (application)" with different okurigana as a keyword. It is also assumed that the "application" with one okurigana and the "application" with different okurigana are presented in a response sentence in a certain turn. In this case, where the FAQ collection 120 is searched using the "application" with one okurigana in the immediately following turn, a large number of FAQs are extracted as answer candidates. On the other hand, where the FAQ collection is searched using the "application" with different okurigana, the answer candidates are narrowed down to one FAQ 120p, and the dialogue path ends. In addition, as compared with the number of dialogue paths ending in a FAQ including the "application" with one okurigana, the number of dialogue paths ending in FAQ 120p including the "application" with different okurigana is small. Since the above information is displayed as aggregation data, the administrator can easily determine that only the FAQ 120p includes a notational fluctuation.

In step S105, the output unit 114 outputs the aggregation data to the display device 13. For example, the keywords may be displayed in the order of keyword example presentation frequency, or the FAQ IDs may be displayed in the order of narrowing-down frequency. Further, the keywords or FAQ IDs may be displayed in different font colors or sizes according to their frequencies.

An example of pseudo-dialogue data will be described with reference to FIG. 5.

Figure 2:
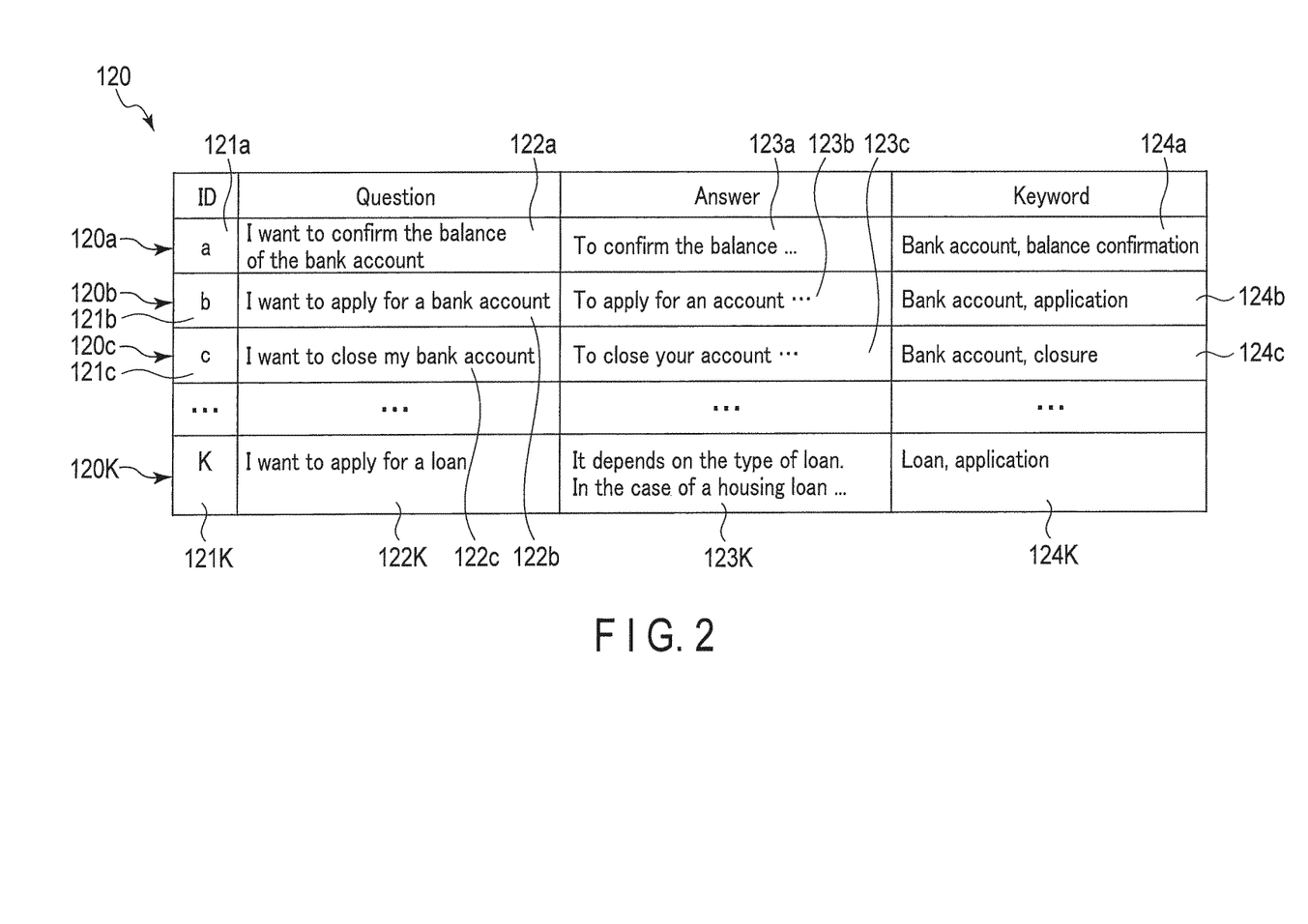
FIG. 2 is a diagram showing an example of a FAQ collection.
Figure 5:
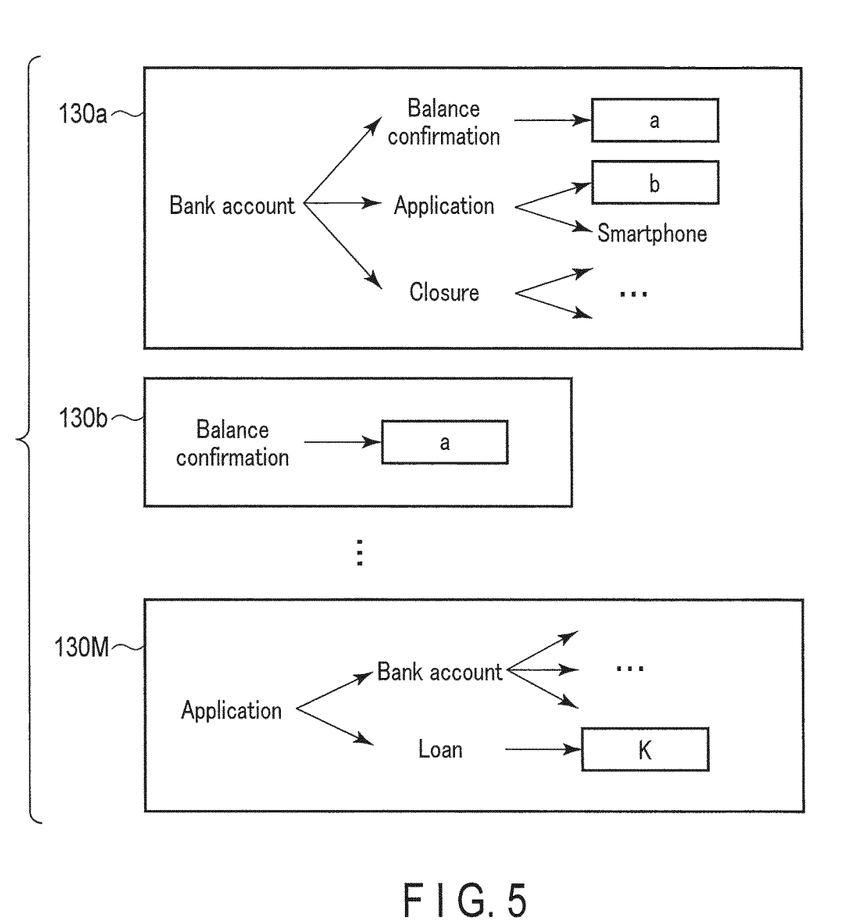
FIG. 5 is a diagram showing an example of pseudo-dialogue data.

FIG. 5 is an example of pseudo-dialogue data 130a to 130M generated based on the FAQ collection 120 shown in FIG. 2. It is assumed that in the FAQ collection 120, the keyword "bank account" is included in three FAQs 120a, 120b and 120c, and the keyword "balance confirmation" is included in one FAQ 120a.

The pseudo-dialogue data 130a is data that starts from the keyword "bank account" and that includes all dialogue paths branching from the starting point. The process of generating the pseudo-dialogue data 130a will be described below in relation to the operation of the information processing apparatus 1.

In the first turn, the pseudo-dialogue generation unit 111 extracts the keyword "bank account" from the FAQ collection 120 (step S101), and starts a dialogue path starting from the keyword "bank account" (step S201). Next, the pseudo-dialogue generation unit 111 selects the dialogue path (step S202), and generates an utterance sentence using the keyword "bank account" included in the selected dialogue path (step S203). The response generation unit 112 searches the FAQ collection 120, using the "bank account" included in the utterance sentence (step S204). At this time, three FAQs 120a, 120b and 120c including "bank account" as a keyword are extracted as answer candidates. Next, the response generation unit 112 generates a response sentence, using the keywords "balance confirmation", "application" and "closure", which are included in the FAQs 120a, 120b, 120c and are different from the "bank account", as keyword examples (step S205). At this time, a response sentence, such as "There are three answer candidates. Are there any other keywords? About <balance confirmation>, about <application>, about <closure>, etc.", is generated. The pseudo-dialogue generation unit 111 determines that the generated response sentence includes the keyword examples "balance confirmation", "application" and "closure" (Yes in step S206), adds these keyword examples "balance confirmation", "application" and "closure" to the dialogue path starting from the "bank account", as intermediate points, and branches the dialogue path into three (step S207). Next, the pseudo-dialogue generation unit 111 determines that there are still uncompleted dialogue paths ("bank account"-"balance confirmation", "bank account"-"application", "bank account"-"closure") (No in step S209), and the process returns to step S202.

In the second turn, the pseudo-dialogue generation unit 111 selects the dialogue path "bank account"-"balance confirmation" that has not been completed, in order to process this dialogue path (step S202). Next, the pseudo-dialogue generation unit 111 generates an utterance sentence including all keywords "bank account" and "balance confirmation" that are selected in the first turn and the second turn of the dialogue path, respectively (step S203). The response generation unit 112 searches the FAQ collection 120, using the "bank account" and "balance confirmation" included in the utterance sentence (step S204). At this time, one FAQ 120a including both "bank account" and "balance confirmation" is extracted as an answer candidate. That is, since narrowing-down to one FAQ can be made, the response generation unit 112 uses the "question" and "answer" included in the FAQ 120a and generates a response sentence, such as "Your question is 'I. want to check the balance of the bank account'. To confirm the balance . . . ," (step S205). The pseudo-dialogue generation unit 111 determines that the generated response sentence does not include any keyword example (No in step S206), adds ID121a "a" of the narrowed-down FAQ 120a to the dialogue path "bank account"-"balance confirmation" as an ending point, and the dialogue path is thus terminated (step S208).

Since the dialogue path starting from the "bank account" includes dialogue paths "bank account"-"application" and "bank account"-"closure" that have not been completed, the information processing apparatus 1 recursively repeats a similar operation until the end of each dialogue path. When all dialogue paths are completed (Yes in step S209), the generation of pseudo-dialogue data relating to the "bank account" ends, and pseudo-dialogue data 130a is generated.

For the remaining keywords for which processing is not performed, the information processing apparatus 1 similarly repeats the series of pseudo-dialogue data generation process. When the processing is completed for all M keywords included in the FAQ collection 120, pseudo-dialogue data 130a to 130M corresponding to all keywords are generated.

An example of aggregation data will be described with reference to FIG. 6.

Figure 6:
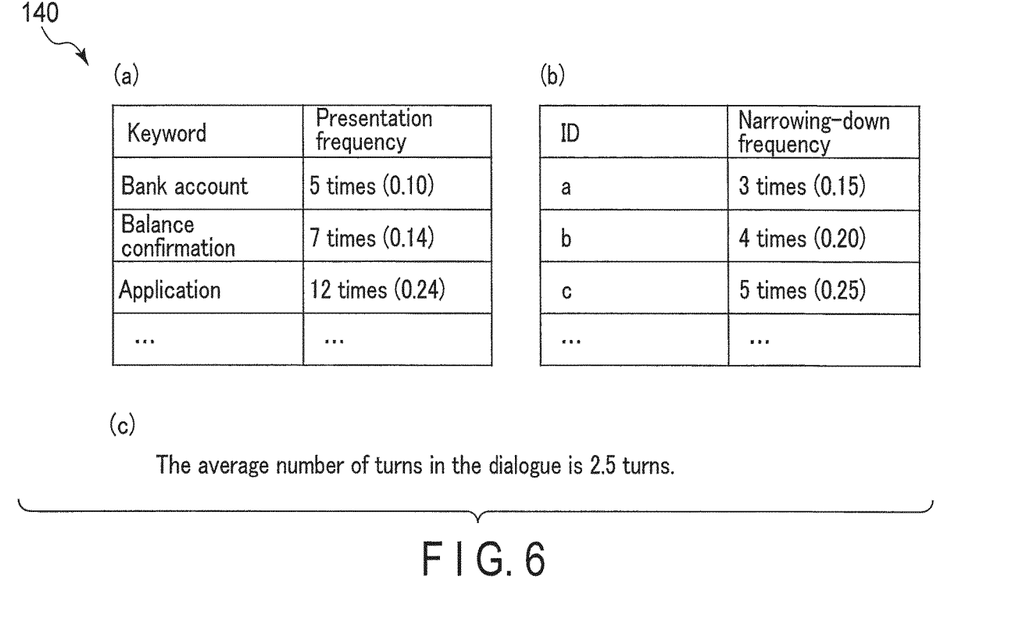
FIG. 6 is a diagram showing an example of aggregation data.

FIG. 6 shows an example of aggregation data obtained by aggregating the pseudo-dialogue data 130a to 130M shown in FIG. 5. The aggregation data is displayed on the display device 13.

As the aggregation data 140, a correspondence table (a) showing an keyword example and its presentation frequency, a correspondence table (b) showing a FAQ ID to which answer candidates are narrowed down and a narrowing-down frequency, and comments (c) including an average number of turns performed until the end of dialogues are displayed. These items (a), (b) and (c) may be displayed simultaneously, or may be switchingly displayed on the area of the same screen.

For example, in the correspondence table (a), the keyword "bank account" and "5 times", which is a presentation frequency corresponding to the "bank account", are displayed. The ratio of the number of times a specific keyword is presented to the number of times all keywords are presented may be displayed in association with the presentation frequency. In this case, "(0.10)" is displayed in association with the presentation frequency "5 times."

For example, in the correspondence table (b), the FAQ ID "a" and "3 times", which is a narrowing-down frequency corresponding to "a", are displayed. The ratio of the number of times a specific ID is narrowed down to the number of times all IDs are narrowed down may be displayed in association with the narrowing-down frequency. In this case, "(0.15)" is displayed in association with the narrowing-down frequency "3 times."

According to the first embodiment described above, the information processing apparatus 1 displays aggregation data in which data representing how often the keyword examples included in the FAQ collection are used in the responses the dialogue system produces based on the FAQ collection are aggregated. By checking the displayed aggregation data, the administrator of the FAQ collection can edit data suitable for use in the dialogue system while simultaneously verifying the operation of the dialogue system. That is, the information processing apparatus 1 can assist the editing of data suitable for use in the dialogue system.

Second Embodiment

Figure 7:
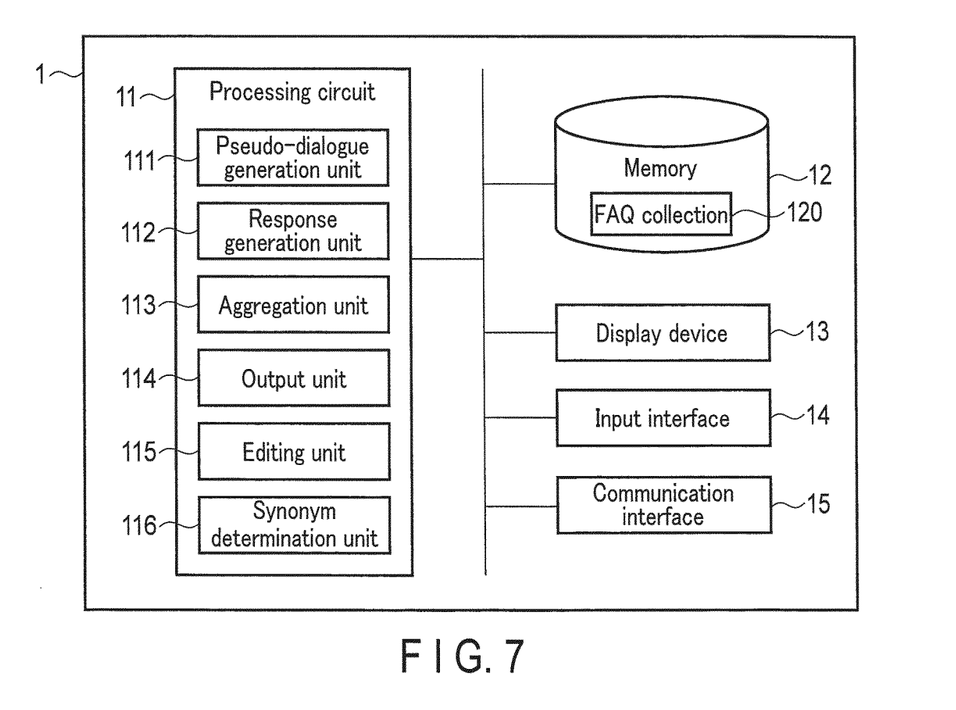
FIG. 7 is a diagram showing a configuration example of an information processing apparatus according to a second embodiment.

A configuration example of an information processing apparatus 1 according to a second embodiment will be described with reference to FIG. 7.

In the second embodiment, the processing circuit 11 includes an editing unit 115 and a synonym determination unit 116, in addition to the elements of the information processing apparatus 1 of the first embodiment.

The editing unit 115 edits one or more FAQs of the FAQ collection.

The synonym determination unit 116 extracts one or more similar keywords similar to an edited keyword from among a plurality of edited keywords included in the FAQ collection and related to edited FAQ, further extracts similar keywords that are used more often in the aggregation data than the other edited keywords, as correction candidate keywords, and generates the frequency of use of the edited keywords and the frequency of use of the correction candidate keywords as correction proposal information.

Figure 8:
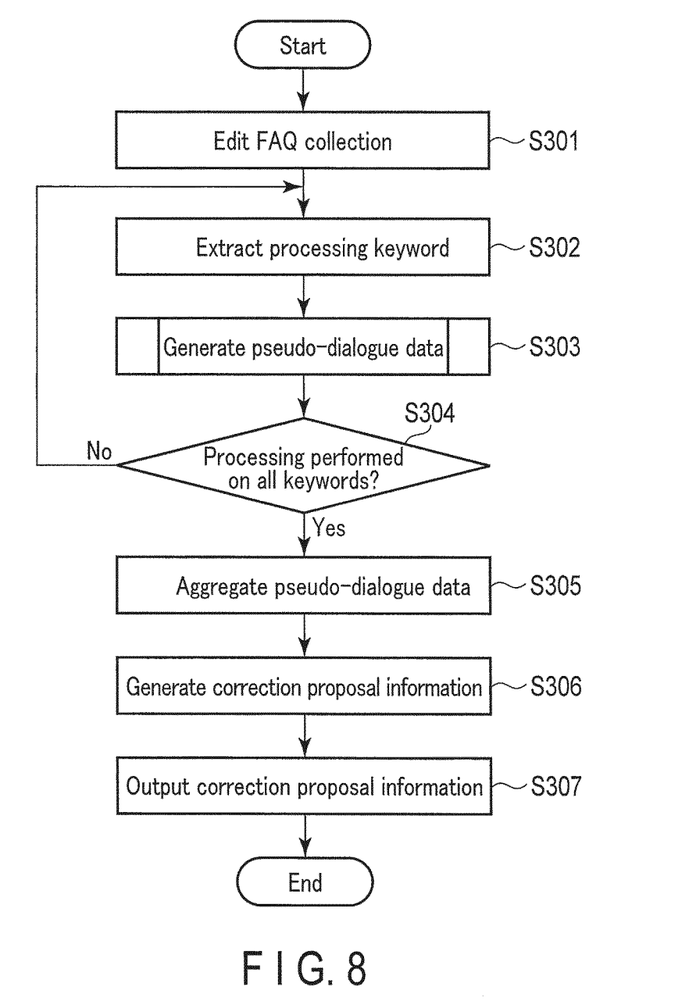
FIG. 8 is a diagram showing an operation example of the information processing apparatus according to the second embodiment.

A configuration example of the information processing apparatus 1 according to the second embodiment will be described with reference to FIG. 8.

In step S301, the editing unit 115 edits the FAQ collection 120 stored in the memory 12 in accordance with an editing operation the user performs for the FAQ collection 120. Editing operations include, for example, adding a new FAQ, and modifying or deleting an existing FAQ. The editing unit 115 may edit the FAQ collection 120 at a time in response to the same or different editing operations the user performs for a plurality of FAQs. In the present embodiment, it is assumed that the editing operation is performed on one FAQ, and the edited FAQ is referred to as FAQ 120S.

In step S302, the pseudo-dialogue generation unit 111 extracts one of a plurality of keywords 124a to 124K included in the FAQ collection 120 stored in the memory 12 as a processing keyword. Step S302 is similar to step S101.

In step S303, the information processing apparatus 1 generates pseudo-dialogue data, using the extracted processing keyword. Step S303 is similar to step S102.

In step S304, the pseudo-dialogue generation unit 111 determines whether or not processing has been performed on all keywords included in the FAQ collection 120. Step S304 is similar to step S103.

In step S305, the aggregation unit 113 aggregates the pseudo-dialogue data 130a to 130M and generates aggregation data. Step S305 is similar to step S104.

In step S306, the synonym determination unit 116 generates correction proposal information, based on the aggregation data and the edited FAQ 120S. Specifically, the synonym determination unit 116 extracts a keyword (similar keyword) from the keywords 124a to 124K included in the FAQ collection 120, for each of the keywords (edited keywords) associated with the edited FAQ 120S. Subsequently, the synonym determination unit 116 extracts a similar keyword that is included in the extracted similar keywords and that is presented in the pseudo-dialogue data 130a to 130M a larger number of times than the edited keyword, as a correction candidate keyword. The correction candidate keyword is a keyword to which the edited keyword should be corrected. Thereafter, information representing how often each of the edited keyword and the correction candidate keyword is presented is generated as correction proposal information. At this time, how the frequency of use changes relatively before and after the correction may be included in the correction proposal information, together with the presentation frequency of each keyword. Further, the ID, question, answer and keyword that are related to the FAQ 120S may be included in the correction proposal information. The generated correction proposal information is stored in the memory 12.

When a keyword similar to the edited keyword is determined, keywords having the same "kanji" portion and different "okurigana" may be first determined as similar keywords. Second, keywords that are read in the same way may be determined as similar keywords. In addition, keywords whose editing distances or cosine distances between word vectors are equal to or less than a threshold value may be determined as similar keywords.

In step S307, the output unit 114 outputs the generated correction proposal information to the display device 13. The correction proposal information may be output together with the aggregation data generated in step S305.

Figure 9:
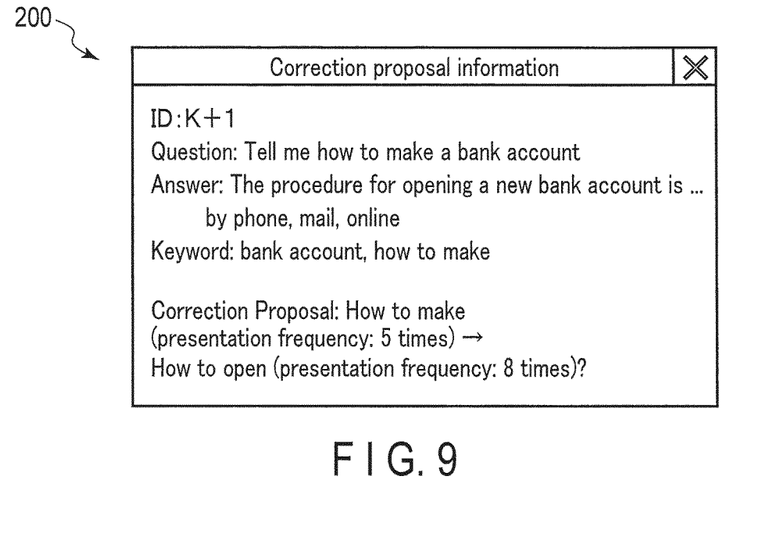
FIG. 9 is a diagram showing an example of correction proposal information.

An example of the correction proposal information will be described with reference to FIG. 9.

The correction proposal information 200 is an example of correction proposal information obtained when new (K+1)th FAQ 120K+1 is added to the FAQ collection 120. In the correction proposal information 200, the ID "K+1" associated with the FAQ 120K+1, the question "Tell me how to make a bank account", the answer "The procedure for opening a new bank account is . . . by phone, mail, online", keywords "bank account, how to make" are displayed.

Further, in the correction proposal information 200, the presentation frequency "5 times" of the edited keyword "how to make" of the FAQ 120K+1 and the presentation frequency "8 times" of the correction candidate keyword "how to open" are displayed. Specifically, the correction proposal that encourages the administrator to change the edited keyword is displayed as follows: "How to make (presentation frequency: 5 times)→How to open (presentation frequency: 8 times)?". The correction proposal may be displayed as "If you change "How to make" to "How to open", the FAQ will become 1.6 times easier to find."

In addition to the above information, the correction proposal information 200 may display a dialogue path. For example, in the dialogue path, the part related to a FAQ for which a correction is proposed may be displayed by color coding or the like so as to be distinguishable from the other parts. For example, a tree diagram or a state transition diagram may be used to indicate the dialogue path. Further, diagrams showing how the dialogue path is changed before and after the correction may be arranged vertically or horizontally so that how the dialogue path changes before and after the correction can be visually recognized easily. Alternatively, instead of arranging the diagrams at the same time, they may be displayed on the same place such that they can be switched from one to the other in response to a user operation.

According to the second embodiment described above, the information processing apparatus 1 displays aggregation data in which data representing how often the keyword examples included in the FAQ collection are used in the responses the dialogue system produces based on the FAQ collection are aggregated. This allows the administrator to easily determine how the editing operation for the FAQ collection has influence on the flow of dialogue. Thus, the administrator can edit the FAQ collection while simultaneously checking the operation of the dialogue system based on the FAQ collection. Further, as the administrator edits the FAQ collection more, the keywords the dialogue system presents to the user become more useful to the progress of the dialogue. It is therefore possible to provide a dialogue system that guides the user to an appropriate FAQ and that is easy for the user to use. Still further, the administrator can edit the FAQ collection while simultaneously checking the operation of the dialogue system, so that the administrator can be assisted to create an FAQ that is easy for the user to search. That is, the information processing apparatus 1 can assist the editing of data suitable for use in the dialogue system.

Third Embodiment

Figure 10:
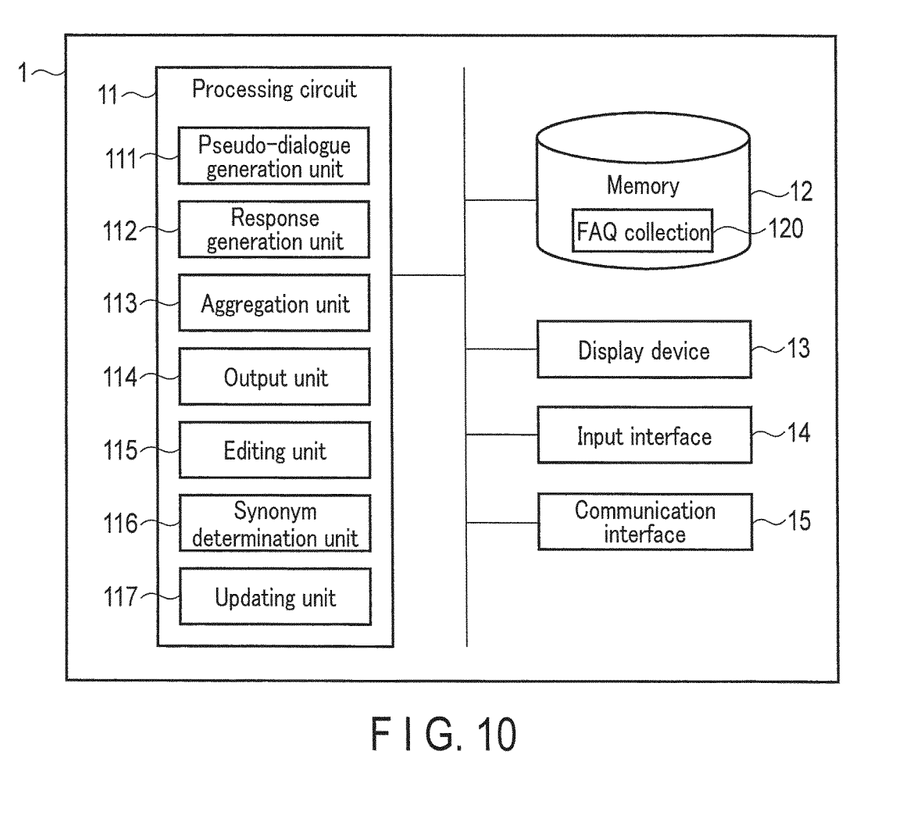
FIG. 10 is a diagram showing a configuration example of an information processing apparatus according to a third embodiment.

A configuration example of an information processing apparatus 1 according to a third embodiment will be described with reference to FIG. 10.

In the third embodiment, the processing circuit 11 includes an updating unit 117, in addition to the elements of the information processing apparatus 1 of the second embodiment.

The updating unit 117 updates the FAQ collection, based on the correction proposal information.

Figure 11:
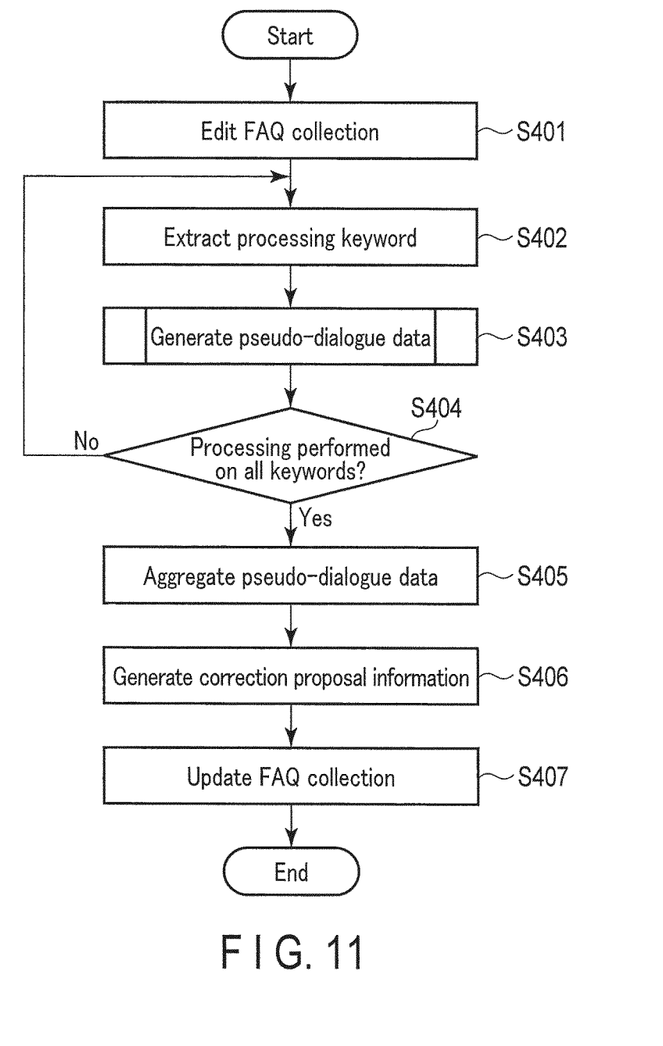
FIG. 11 is a diagram showing an operation example of the information processing apparatus according to the third embodiment.

An operation example of the information processing apparatus according to the third embodiment will be described with reference to FIG. 11.

Step S401 to step S406 are similar to step S301 to step S306, respectively.

In step S407, the updating unit 117 updates the FAQ collection 120, based on the correction proposal information. Where there are a plurality of correction proposal information and they conflict with each other, one correction is made based on the similarity of keywords and the aggregation data. Further, where one correction proposal information is related to a plurality of FAQs, the correction is performed for all these FAQs. Before the FAQ collection 120 is automatically updated, a confirmation image may be displayed asking the administrator whether or not to update the FAQ collection 120.

According to the third embodiment described above, the administrator does not have to manually update the FAQ collection. Since the FAQ collection is automatically updated when it is edited, it can be a FAQ collection that is easily used when the dialogue system is in use, and the administrator can manage the FAQ collection more easily. In addition, the administrator can easily modify the FAQ collection depending on whether or not the correction proposal information proposed by the information processing apparatus 1 is adopted. That is, the information processing apparatus 1 can assist the editing of data suitable for use in the dialogue system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising a processing circuit configured to:
   generate each of a plurality of keywords stored in a frequently asked question (FAQ) collection as an utterance sentence, the FAQ collection storing a plurality of FAQs each including a question, an answer to the question, and one or more keywords extracted from the question;
   generate dialogue data for each of the plurality of keywords, the dialogue data generated by performing a dialogue for each of the plurality of keywords at least once, the dialogue obtained by generating a response sentence to the utterance sentence based on a result of searching the FAQ collection by use of the utterance sentence; and
   generate aggregation data representing how often each of the plurality of keywords is used in the dialogue, based on the dialogue data.

2. The apparatus according to claim 1, wherein the processing circuit is further configured to:
   in a first dialogue, extract one keyword from among the plurality of keywords included in the FAQ collection as a first keyword;
   generate a first utterance sentence including the first keyword;
   extract one or more FAQs including the first keyword from the FAQ collection as a first search result, by searching the FAQ collection by use of the first keyword included in the first utterance sentence; and
   when the first search result is one, generate the dialogue data such that the first keyword is a starting point and the extracted one FAQ is an ending point.

3. The apparatus according to claim 2, wherein the processing circuit is further configured to:
   when the first search result is two or more, generate a first response sentence including a plurality of second keywords which are among the keywords included in the extracted FAQs and which are other than the first keyword.

4. The apparatus according to claim 2, wherein the processing circuit is further configured to:
   in an Nth dialogue (N is a natural number of two or more), select one Nth keyword from a plurality of Nth keywords included in an (N−1)th response sentence;
   generate an Nth utterance sentence including the first keyword and (N−1) keywords which are selected from each of (N−1) response sentences;
   extract one or more FAQs including the first keyword and the selected (N−1) keywords as an Nth search result, by searching the FAQ collection by use of the first keyword and the selected (N−1) keywords included in the Nth utterance sentence; and
   when the Nth search result is one, generate the dialogue data such that the first keyword is a starting point, the selected (N−1) keywords are intermediate points, and the extracted one FAQ is an ending point.

5. The apparatus according to claim 4, wherein the processing circuit is further configured to:
   when the Nth search result is two or more, generate an Nth response sentence including a plurality of (N+1)th keywords which are among the keywords included in the extracted FAQs and which are other than the first keyword and the selected (N−1) keywords.

6. The apparatus according to claim 1, wherein the processing circuit is further configured to:
   edit one or more FAQs included in the FAQ collection;
   extract one or more similar keywords similar to an edited keyword from the plurality of keywords included in the FAQ collection, the edited keyword being at least one keyword associated with the edited FAQ;
   extract a similar keyword which is included among the similar keywords and which is used in the aggregation data more often than the edited keyword, as a correction candidate keyword; and
   generate data representing how often the edited keyword and the correction candidate keyword are used, as correction proposal information.

7. The apparatus according to claim 6, wherein the correction proposal information includes information on the edited FAQ.

8. The apparatus according to claim 6, wherein the processing circuit is further configured to update the FAQ collection, based on the correction proposal information.

9. An information processing method comprising:
   generating each of a plurality of keywords stored in a frequently asked question (FAQ) collection as an utterance sentence, the FAQ collection storing a plurality of FAQs each including a question, an answer to the question, and one or more keywords extracted from the question;
   generating dialogue data for each of the plurality of keywords, the dialogue data generated by performing a dialogue for each of the plurality of keywords at least once, the dialogue obtained by generating a response sentence to the utterance sentence based on a result of searching the FAQ collection by use of the utterance sentence; and
   generating aggregation data representing how often each of the plurality of keywords is used in the dialogue, based on the dialogue data.

10. A non-transitory computer readable medium including computer executable instructions, wherein the instructions, when executed by a processor, cause the processor to perform a method comprising:
    generating each of a plurality of keywords stored in a frequently asked question (FAQ) collection as an utterance sentence, the FAQ collection storing a plurality of FAQs each including a question, an answer to the question, and one or more keywords extracted from the question;
    generating dialogue data for each of the plurality of keywords, the dialogue data generated by performing a dialogue for each of the plurality of keywords at least once, the dialogue obtained by generating a response sentence to the utterance sentence based on a result of searching the FAQ collection by use of the utterance sentence; and
    generating aggregation data representing how often each of the plurality of keywords is used in the dialogue, based on the dialogue data.

* * * * *